(12) United States Patent
Imamura et al.

(10) Patent No.: US 11,169,524 B2
(45) Date of Patent: Nov. 9, 2021

(54) HEADING CONTROL DEVICE AND HEADING CONTROL METHOD FOR SHIP

(71) Applicant: Mitsubishi Electric Corporation, Tokyo (JP)

(72) Inventors: Naoki Imamura, Tokyo (JP); Ryo Sakaguchi, Tokyo (JP); Daisuke Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 121 days.

(21) Appl. No.: 16/382,597

(22) Filed: Apr. 12, 2019

(65) Prior Publication Data
US 2019/0324462 A1 Oct. 24, 2019

(30) Foreign Application Priority Data

Apr. 18, 2018 (JP) .............................. JP2018-079559

(51) Int. Cl.
*G05D 1/02* (2020.01)
*B63J 99/00* (2009.01)
*B63H 20/12* (2006.01)

(52) U.S. Cl.
CPC ........... *G05D 1/0206* (2013.01); *B63H 20/12* (2013.01); *B63J 99/00* (2013.01)

(58) Field of Classification Search
CPC .......... B63H 20/12; B63H 25/04; B63J 99/00; G05D 1/0206; B63B 79/00
See application file for complete search history.

(56) References Cited

U.S. PATENT DOCUMENTS

| 4,799,163 A * | 1/1989 | Wesner ................ G05D 1/0206 114/144 RE |
| 6,273,771 B1 * | 8/2001 | Buckley ............... B63H 21/213 114/144 RE |
| 9,676,464 B2 * | 6/2017 | Johnson ............... G05D 1/0206 |
| 10,112,648 B2 * | 10/2018 | Tamura ................. B60W 30/10 |

(Continued)

FOREIGN PATENT DOCUMENTS

| JP | 56-124595 A | 9/1981 |
| JP | 2001-018893 A | 1/2001 |

(Continued)

OTHER PUBLICATIONS

Japanese Office Action for 2018-079559 dated Feb. 12, 2019.

*Primary Examiner* — Behrang Badii
*Assistant Examiner* — Daniel L Greene
(74) *Attorney, Agent, or Firm* — Sughrue Mion, PLLC; Richard C. Turner

(57) ABSTRACT

An object is to obtain a heading control device and a heading control method for ship in which a heading control system is configured on the basis of ship motion information, without promoting oscillation excited by disturbance factors to the ship, such as tidal current or wind. The heading control device for ship, which causes a ship provided with an outboard motor to sail at a desired heading, includes: a heading generator which outputs a heading command; and a controller which outputs a rudder angle command on the basis of the heading command from the heading generator, sensor group information from a sensor group, and ship motion characteristic information from a ship motion characteristic information storage unit.

15 Claims, 7 Drawing Sheets

(56) References Cited

U.S. PATENT DOCUMENTS

| | | | |
|---|---|---|---|
| 2003/0079668 A1* | 5/2003 | Morvillo | B63H 11/11 114/151 |
| 2004/0006423 A1* | 1/2004 | Fujimoto | G05D 1/0206 701/467 |
| 2006/0121803 A1* | 6/2006 | Morvillo | B63H 25/02 440/41 |
| 2017/0139426 A1* | 5/2017 | Ito | B63H 21/21 |

FOREIGN PATENT DOCUMENTS

| | | |
|---|---|---|
| JP | 2010-274866 A | 12/2010 |
| JP | 2011-189884 A | 9/2011 |
| JP | 2017-088120 A | 5/2017 |

\* cited by examiner

HEADING CONTROL DEVICE AND HEADING CONTROL METHOD FOR SHIP

BACKGROUND OF THE INVENTION

1. Field of the Invention

The present disclosure relates to a heading control device and a heading control method for ship, that cause a ship provided with an outboard motor to sail at a desired heading.

2. Description of the Background Art

One of conventional automatic steering devices for ship includes an identification calculation unit which receives an actual deviation between a reference course and a bow heading and which performs parameter identification by offline calculation so as to minimize a difference (identification error) between the actual deviation and a model deviation which is a deviation between the reference course and output of a control object model, and outputs the resultant value to a physical model of a control object (for example, Patent Document 1). When the identification error is minimum, an actual control object and the control object model approximately coincide with each other, and a parameter representing the control object model at this time approximately coincides with a parameter of the actual control object.

Also, there is known a steering control device that includes: a heading sensor for detecting a bow heading; a roll angle sensor for detecting a roll angle; a heading setting unit for receiving setting of a target heading; a deflection angle detection unit for detecting a deflection angle which is a deviation angle between the bow heading and the target heading; and a control state monitoring unit for determining the state of the own ship on the basis of the periodicity of variation in the deflection angle and the periodicity of variation in the roll angle (for example, Patent Document 2).

Patent Document 1: Japanese Laid-Open Patent Publication No. 2001-18893 (paragraphs [0025], [0026], FIG. 1)

Patent Document 2: Japanese Laid-Open Patent Publication No. 2010-274866 (paragraphs [0007], [0009], FIG. 1)

However, in the automatic steering device for ship of Patent Document 1, a physical model that is estimated is a simple Nomoto model (mathematical model proposed by Nomoto) obtained by approximating a dynamic characteristic of an actual rudder angle and an actual yaw rate by a first-order lag element. Therefore, in the first place, it is impossible to identify an oscillation pole of the actual control object which can vary depending on the state such as ship speed. Since the oscillation pole of the actual control object is not considered for a dynamic characteristic of the physical model, the automatic steering device which performs automatic steering without accurately representing the actual behavior of the ship is to perform control adjustment on a trial-and-error basis and has no choice but to lower a control band (or bandwidth) so that the actual control object does not oscillate, thus causing a problem that control response becomes conservative.

In the steering control device of Patent Document 2, it is described that a roll angle detection value is used for discriminating between periodic yawing oscillation due to disturbance and oscillation due to control. However, Patent Document 2 focuses on the discrimination of the oscillation, and there is no description relevant to state transition of a control system after occurrence of the oscillation.

In determination as to the above two types of oscillation states, if the frequency of the periodic yawing oscillation due to disturbance is lower than the heading control band, a heading control system acts to suppress the yawing oscillation, but if the frequency of the yawing oscillation is higher than the heading control band, the yawing oscillation cannot be suppressed. Needless to say, as for the oscillation due to control, since the control band of each control loop configuring the heading control system is designed with the dynamic characteristic of the control object grasped accurately, oscillation prediction can be fully performed without detection of the roll angle.

SUMMARY OF THE INVENTION

The present disclosure has been made to solve the above problem, and an object of the present disclosure is to provide a heading control device and a heading control method for ship in which a heading control system is configured on the basis of ship motion information having a frequency response characteristic from an actual rudder angle to an actual yaw rate acquired under various conditions such as change of the ship speed, without promoting oscillation excited by disturbance factors to the ship, such as tidal current or wind.

A heading control device for ship according to one aspect of the present disclosure is a heading control device for ship, which causes a ship provided with an outboard motor to sail at a desired heading, the heading control device including: a heading generator which outputs a heading command; and a controller which outputs a rudder angle command on the basis of the heading command from the heading generator, sensor group information from a sensor group provided to the ship, and characteristic information from a ship motion characteristic information storage unit.

The heading control device for ship according to one aspect of the present disclosure can absorb modeling error of a control object which can vary depending on the ship speed or the like, through gain scheduling of the control calculator. As a result, it becomes possible to perform designing robust against change in the characteristic of the control object, and disturbance suppression performance and target value response performance which affect the heading control can be properly adjusted. Further, oscillation excited by disturbance factors to the ship such as tidal current or wind is not promoted, and thus stable heading control can be achieved.

The foregoing and other objects, features, and advantageous effects of the present disclosure will become more apparent from detailed description in the following embodiments and description in the accompanying drawings.

DETAILED DESCRIPTION OF THE PREFERRED EMBODIMENTS OF THE INVENTION

Figure 1:
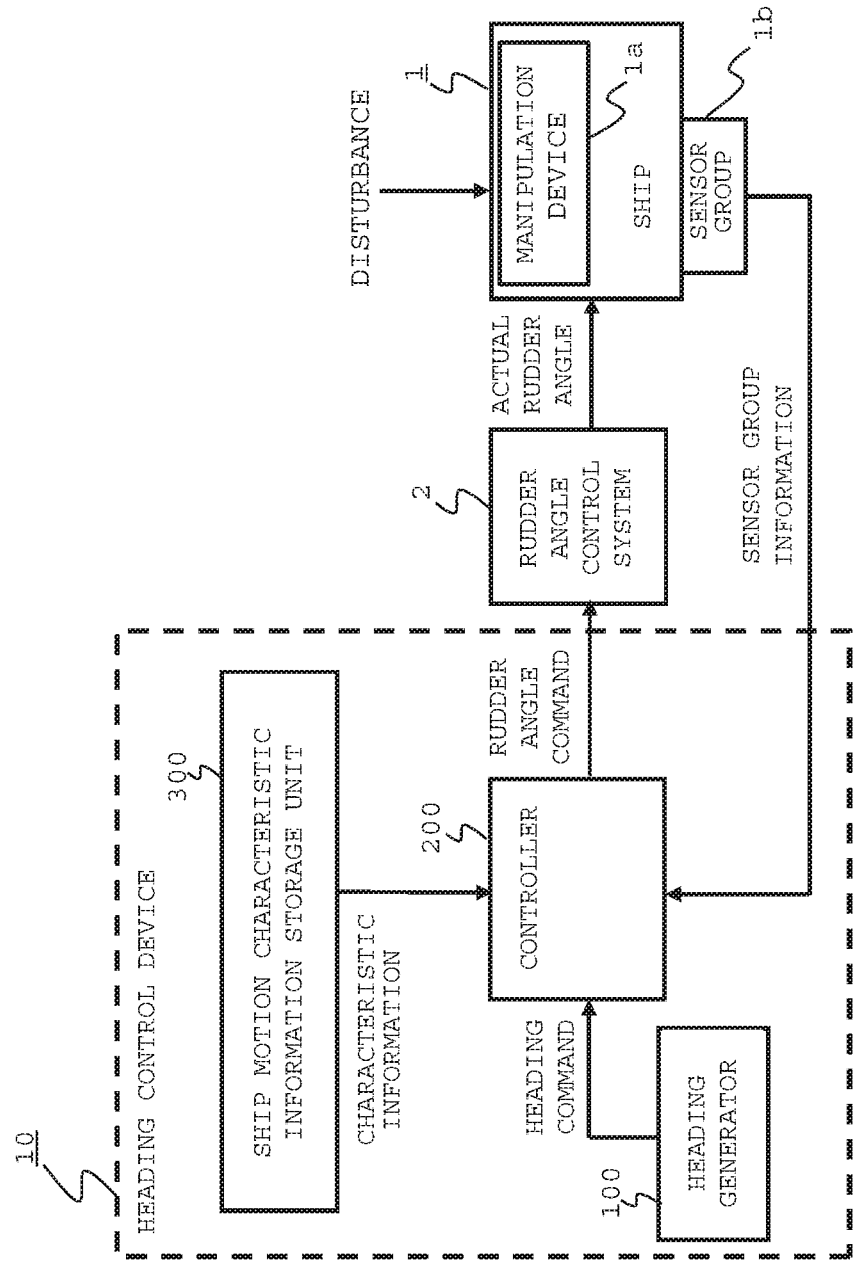
FIG. 1 is a block diagram showing a configuration example of a heading control system for ship according to the first embodiment.

Hereinafter, preferred embodiments of a heading control device and a heading control method for ship will be described with reference to the drawings.

In the embodiments, the same or corresponding parts are denoted by the same reference characters and the description thereof is omitted.

First Embodiment

FIG. 1 is a block diagram showing a configuration example of a heading control system for ship according to the first embodiment, and shows the relationship among a ship as a control object, a sensor group, a rudder angle control system, and a heading control device for ship.

In FIG. 1, a ship 1 is basically equipped with one or a plurality of outboard motors (not shown) which are actuators for controlling a heading angle or a translational motion in front-rear and right-left directions of the ship. The outboard motor includes a thrust producing mechanism for providing a thrust for a ship body, and a steering mechanism for performing steering (both are not shown), and mainly, the rudder angle of the outboard motor is controlled on the basis of a rudder angle command outputted from the heading control device for ship.

One example of a propulsion and steering mechanism for the ship 1 is an outboard motor often used for a small ship and configured such that an engine body with a screw integrally provided under the engine is mounted to the outside of the ship and the direction of the ship 1 is changed by changing the body direction. The present disclosure is not limited to such an outboard motor for small ship, but is also applicable to a large ship 1 having a propulsion and steering mechanism configured such that a driving portion such as an engine is provided inside the ship and a screw portion the direction of which can be varied is exposed outside the ship.

The following description assumes both of the above cases as the outboard motor.

The ship 1 is further provided with: a manipulation device 1a for a ship operator to input an initial condition and a final condition of sailing of the ship; and a sensor group 1b for detecting the sailing state of the ship.

The sensor group 1b is composed of, for example, a global positioning system (hereinafter, referred to as GPS) for measuring the latitude and longitude of the ship 1, and a magnetic heading sensor for measuring the heading angle of the ship 1. The sensor group 1b may include a known inertial navigation system having a gyroscope for measuring the angular velocity of the ship 1, an acceleration sensor for measuring a translational acceleration of the ship 1, and the like.

Figure 2:
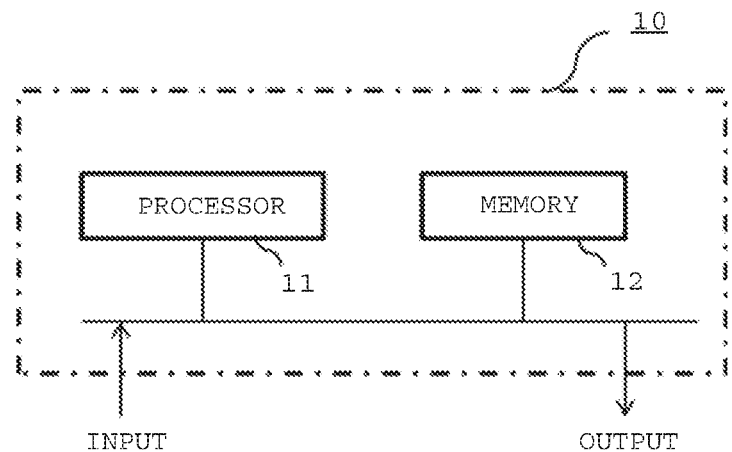
FIG. 2 is a block diagram showing a hardware configuration example of a heading control device for ship which is a major part of the first embodiment.

The heading control device 10 for ship, to which outputs of the sensor group 1b are supplied, is composed of a heading generator 100, a controller 200, and a ship motion characteristic information storage unit 300, and output of the controller 200 is supplied to a propulsion and steering mechanism of the ship 1 via a rudder angle control system 2, so as to sail the ship 1. The components of the heading control device 10 for ship are formed by a processor 11 and a memory 12 as shown in FIG. 2 which shows an example of a hardware configuration thereof. Although not shown in detail, the memory 12 includes a volatile storage device such as a random access memory, and a non-volatile auxiliary storage device such as a flash memory, and a program inputted from the memory 12 is to be executed. In this case, the program is inputted to the processor 11 from the auxiliary storage device via the volatile storage device. The processor 11 may output data such as a calculation result to the volatile storage device of the memory 12, and the data may be stored into the auxiliary storage device via the volatile storage device. Examples of the auxiliary storage device include, other than the flash memory, hard disks such as a magnetic disk, a flexible disk, an optical disc, a compact disc, a MiniDisc, and a DVD.

Some of the functions of the components may be implemented by dedicated hardware, and some of the functions of the components may be implemented by software or firmware.

Figure 10:
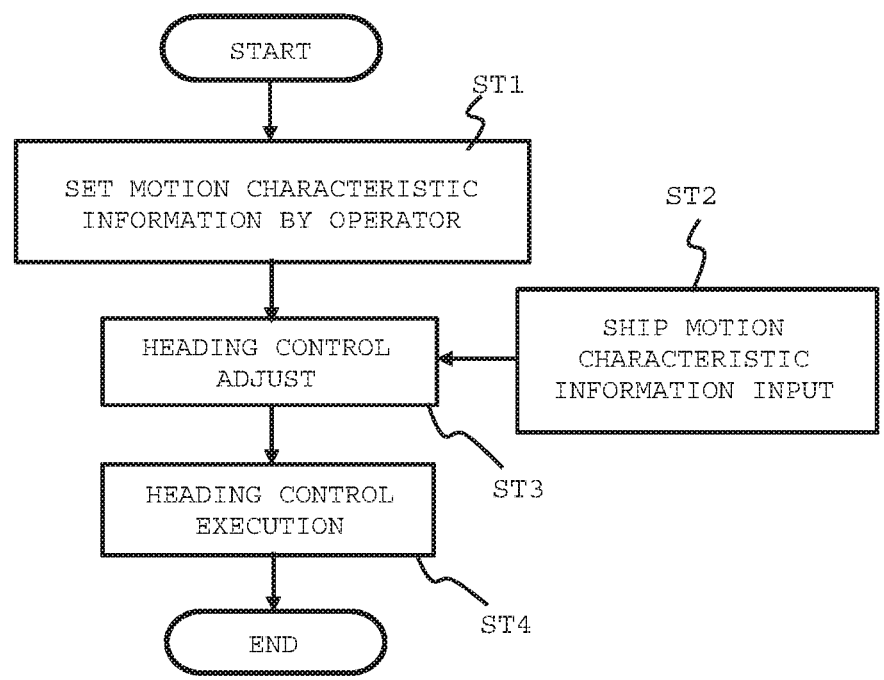
FIG. 10 is a flowchart showing a basic operation of the heading control device for ship according to the first embodiment.

Next, description will be given with reference to FIG. 10 which shows a basic operation of the heading control device for ship according to the first embodiment.

First, the ship operator sets a motion condition for the heading control device for ship (step ST1). Next, a heading command obtained on the basis of the motion condition and ship motion characteristic information described later are inputted and a parameter of heading control is adjusted (step ST2 and step ST3). Thereafter, the heading control is executed (step ST4).

Next, the functions of the heading generator 100, the controller 200, and the ship motion characteristic information storage unit 300 composing the heading control device 10 for ship will be described in detail.

Figure 3:
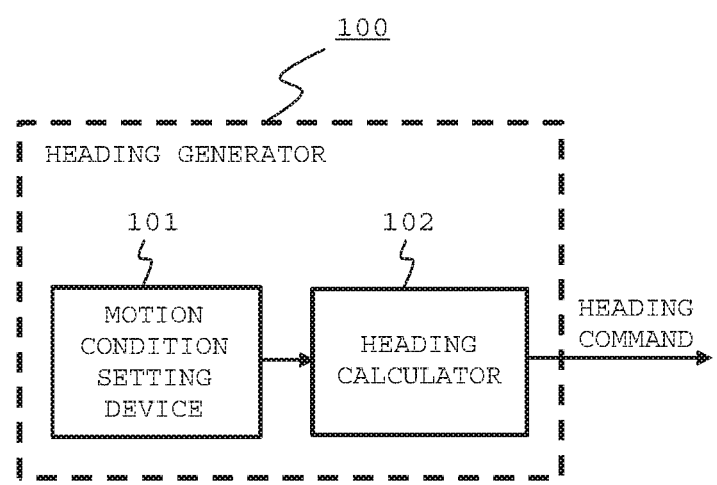
FIG. 3 is a block diagram showing the internal configuration of a heading generator shown in FIG. 1.

FIG. 3 is a block diagram showing the internal configuration of the heading generator 100. In FIG. 3, the heading generator 100 includes a motion condition setting device 101 and a heading calculator 102. The motion condition setting device 101 is for setting an initial condition and a final condition for sailing of the ship 1, and these are set by the ship operator inputting them to the manipulation device 1a of the ship 1.

For example, the following information is set: an attitude angle (which is synonymous with heading angle or yaw angle), an angular velocity (obtained by differentiating the attitude angle once with respect to time), and an angular acceleration (obtained by differentiating the attitude angle twice with respect to time) in an initial state before start of sailing and in a final state at the time when desired sailing is completed. In the condition setting, numerical values representing the attitude angle, the angular velocity, and the angular acceleration may be given. Recently, a user interface of the GPS is often formed as a touch panel, and therefore, for the initial state, detection values of the sensor group 1b may be automatically taken in as the sensor group information, and only the final state may be set through touch input on a user interface screen.

The heading calculator 102 receives information SCI about the initial state and information ECI about the final state outputted from the motion condition setting device 101, and calculates specific heading command information DRC. Several methods are conceivable for calculating the heading command information DRC.

For example, a trajectory expressed as a polynomial of time t is calculated on the basis of the attitude angle, the angular velocity, and the angular acceleration in the initial state information SCI and the final state information ECI about the ship 1 obtained in the motion condition setting device 101. A linear trajectory connecting the initial state information SCI and the final state information ECI with the shortest time may be calculated, or a trajectory that allows the final state to be reached from the initial state with the minimum fuel may be calculated. That is, in transition from the initial state to the final state, an optimum trajectory that minimizes a predetermined evaluation function, e.g., an optimum trajectory in terms of shortest time or an optimum trajectory in terms of minimum fuel, may be calculated.

Figure 4:
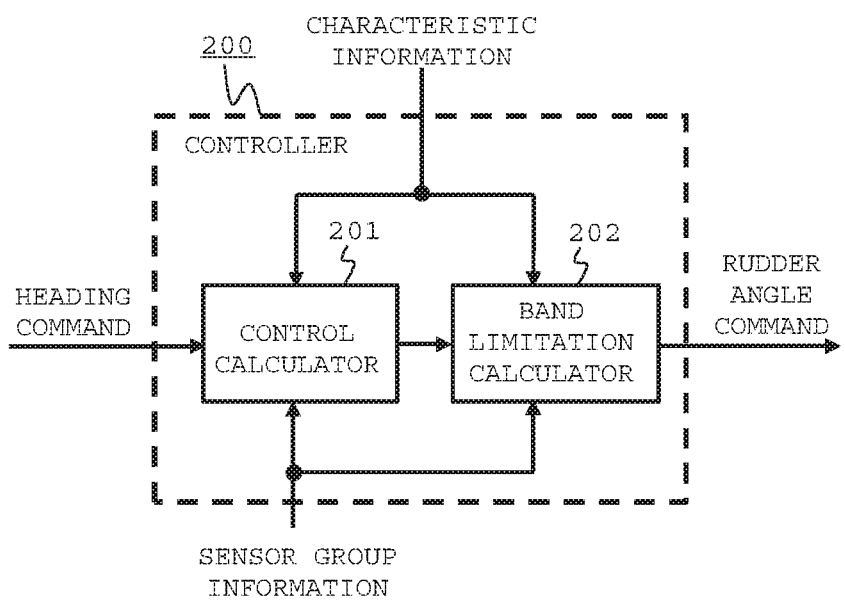
FIG. 4 is a block diagram showing the internal configuration of a controller shown in FIG. 1.

Next, as shown in FIG. 4, the controller 200 is composed of a control calculator 201 and a band limitation calculator 202. The control calculator 201 outputs a pre-limitation rudder angle command through known proportional integral derivative (PID) control on the basis of the heading command information DRC outputted from the heading generator 100 and sensor group information SEI outputted from the sensor group 1b.

Here, as the configuration of the PID control system, for example, on the basis of a heading deviation between the heading command information DRC and an actual heading which is a part of the sensor group information SEI, PID calculation may be performed using the heading deviation as an input. In addition, as the configuration of the PID control system, differential-preceding PI_D control may be employed which performs calculation by multiplying a gain with a velocity deviation which is a difference between: a velocity command equivalent obtained by performing, on the basis of the heading deviation between the heading command information DRC and the actual heading which is a part of the sensor group information SEI, PI calculation using the heading deviation as an input; and an actual yaw rate obtained by differentiating the actual heading in the sensor group information SEI once with respect to time, and P_PI control may be employed which performs PI calculation of a velocity deviation between: a velocity command equivalent obtained by P (Proportional) calculation on the basis of a heading deviation between the heading command information DRC and the actual heading in the sensor group information SEI; and an actual yaw rate obtained by differentiating the actual heading in the sensor group information SEI once with respect to time. That is, as the configuration of the PID control system, various PID control configurations in classical control theories are applicable.

As preprocessing for a deviation signal indicating the heading deviation, dead zone processing may be applied which sets the deviation to 0 for convenience sake in a predetermined zone in which the deviation is small.

Output of the control calculator 201 is supplied to the band limitation calculator 202, so that an output signal in an unnecessary frequency band is attenuated. For example, a notch filter or a band-pass filter is applicable thereto. Alternatively, a component having a filter processing function for attenuating a signal in an unnecessary frequency band may be employed.

Next, the ship motion characteristic information storage unit 300 which inputs information to the control calculator 201 and the band limitation calculator 202 will be described. The heading motion of the ship 1 is generally characterized as a frequency response characteristic of an actual yaw rate with respect to an actual rudder angle. For example, in the aforementioned Patent Document 1, a known Nomoto model is used in which the frequency response characteristic of an actual yaw rate with respect to an actual rudder angle is approximated by a first-order lag element. However, the frequency response characteristic of the ship 1 greatly varies depending on the motion state of the ship 1, e.g., the velocity of the ship (hereinafter, may be referred to as ship speed). For example, in the case of changing the rudder angle by a predetermined amount at a predetermined speed, the actual yaw rate is small in a region in which the ship speed is low, and the actual yaw rate is great in a region in which the ship speed is high. Therefore, in order to reduce variation in control response depending on the ship speed, in other words, in order that a crossover frequency which determines response of the control system is made constant irrespective of the ship speed, control parameters configuring the control calculator 201 need to be variable in accordance with the ship speed.

Figure 5:
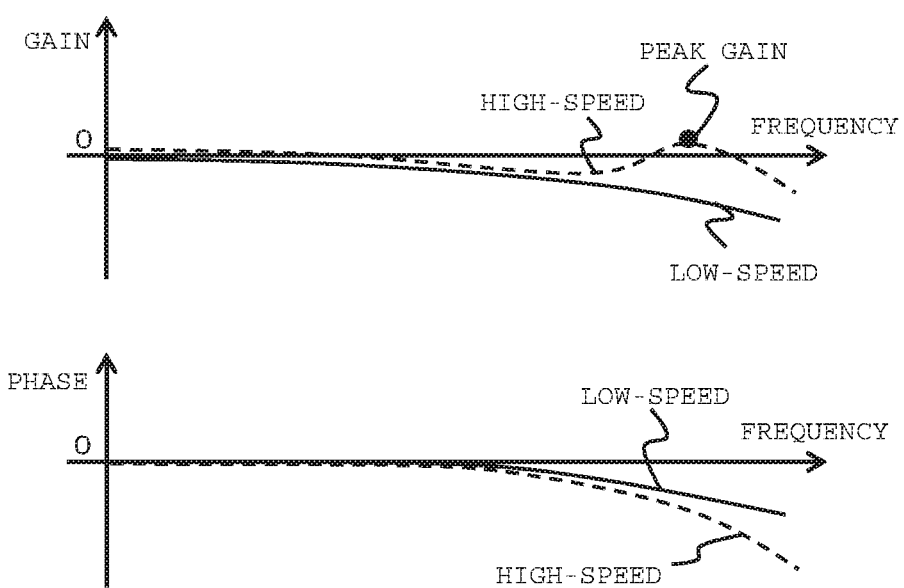
FIG. 5 illustrates an operation characteristic of a ship motion characteristic information storage unit shown in FIG. 1.

In order to appropriately design or set control parameters in the control calculator 201 in accordance with the ship speed as described above, the ship motion characteristic information storage unit 300 has frequency response characteristic information of the actual yaw rate with respect to the actual rudder angle using the ship speed as a parameter. FIG. 5 shows an example of the characteristic in the ship motion characteristic information storage unit 300, and represents the frequency response characteristic of the actual yaw rate with respect to the actual rudder angle, using a gain and a phase. For acquiring the frequency response characteristic, the following means may be used: in a state in which the above PID control loop is disconnected, input of the rudder angle command is set as a sinewave and frequency sweeping is performed, and gains and phases of the actual yaw rate with respect to the actual rudder angle at this time are plotted. Alternatively, input of the rudder angle command may be random input typified by an M sequence.

As shown in FIG. 5, in a low-speed region (indicated by solid line) in which the ship speed is low, a characteristic that can be comparatively easily approximated by a first-order Nomoto model is obtained. However, in a high-speed region (indicated by broken line) in which the ship speed is high, the characteristic has a shape in which, as the gain increases, a mild peak gain appears on the high-frequency side, depending on the condition, and thus the characteristic cannot be approximated by a first-order Nomoto model.

Therefore, in the ship motion characteristic information storage unit 300, the frequency response characteristic of the actual yaw rate with respect to the actual rudder angle using the ship speed as a parameter is approximated as a proper transfer function, for each ship speed. Specifically, with the Laplace operator denoted by s, a [frequency response characteristic of actual yaw rate/actual rudder angle] is approximated by a polynomial of s prescribed as [greatest order number of denominator≥greatest order number of numerator]. The order number corresponds to the order number of the polynomial of s. In this way, the [frequency response characteristic of actual yaw rate/actual rudder angle] can be refined as a characteristic matched with the actual condition while an oscillation pole, i.e., a complex conjugate is also taken into consideration. Therefore, the characteristic information outputted from the ship motion characteristic information storage unit 300 means a proper transfer function approximated for each ship speed.

On the basis of the characteristic information from the ship motion characteristic information storage unit 300 as described above, it is possible to uniquely determine a control parameter in the aforementioned PID control system configured in the control calculator 201, by, for example, a known partial model matching method, so that each control loop has a desirable normative response.

Figure 6:
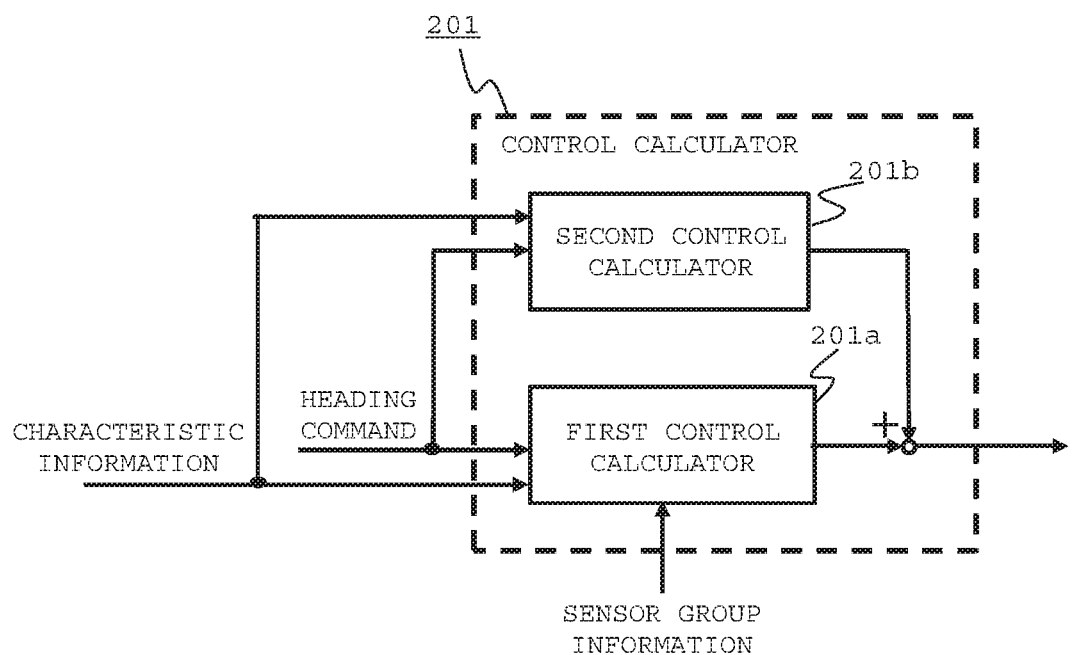
FIG. 6 is a block diagram showing the internal configuration of a control calculator shown in FIG. 4.

FIG. 6 shows a specific internal configuration of the control calculator 201, and the aforementioned PID control system corresponds to a first control calculator 201*a*. That is, the first control calculator 201*a* serves a function of feedback control for causing the actual heading in the detected sensor group information SEI to follow the heading command information DRC. If the format of the feedback control system is determined beforehand as, for example, PI_D control or P_PI control, a crossover frequency design value that should be satisfied by each control loop can be determined on the basis of the characteristic information from the ship motion characteristic information storage unit 300, and then on the basis of the crossover frequency design value, a control parameter in the first control calculator 201*a* can be uniquely determined by a partial model matching method. In addition, on the basis of the ship speed in the sensor group information SEI, the control parameter can be determined as a function or a map with respect to the ship speed. As a result, the first control calculator 201*a* can output first pre-limitation rudder angle command information.

On the other hand, the second control calculator 201*b* serves a function of feedforward control. That is, the second control calculator 201*b* receives the heading command information DRC and generates, as output, second pre-limitation rudder angle command information so as to satisfy the heading command. As the second control calculator 201*b*, for example, a reverse model of the frequency transfer function from the rudder angle control system 2 to the sensor group 1*b* as shown in FIG. 1 can be used. More specifically, if the frequency transfer function from the rudder angle command to the actual heading which is one of detection values of the sensor group 1*b*, i.e., [actual heading/rudder angle command] is determined, [rudder angle command/actual heading] which is a reverse model thereof may be applied.

In the case where the reverse model includes a time derivative of high order, e.g., second order, in order to suppress sharp change in the rudder angle command outputted from the second control calculator 201*b*, a low-pass filter or moving average processing may be provided at a stage subsequent to the reverse model, or approximating processing for decreasing the order number of the reverse model itself may be provided.

On the basis of the characteristic information outputted from the ship motion characteristic information storage unit 300, a parameter of the reverse model may be set as a function or a map according to the ship speed, for example.

That is, while the control parameters of the first control calculator 201*a* and the second control calculator 201*b* can be described as functions of the ship speed, the control parameters can also be described as maps for outputting the control parameters by receiving the ship speed.

Outputs of the first control calculator 201*a* and the second control calculator 201*b* are added by an adder and the resultant value becomes output of the control calculator 201.

Next, the band limitation calculator 202, which receives output of the control calculator 201, attenuates a signal in a predetermined frequency band, the output (pre-limitation rudder angle command) of the control calculator 201, on the basis of characteristic information outputted from the ship motion characteristic information storage unit 300. In general, in a notch filter or a band-pass filter applicable to the band limitation calculator 202, phase change is steep, and therefore, the ship speed which is one piece of the sensor group information SEI is used and the frequency bandwidth for which attenuation is to be performed, the center frequency thereof, or the depth therefor is set variably in accordance with the ship speed. For example, the center frequency can be set to the frequency at a peak gain indicated by a filled circle in the characteristic shown in FIG. 5.

A parameter of such a filter can be described as a function of the ship speed, but can also be described as a map for outputting a control parameter by receiving the ship speed. As a matter of course, the parameter may be a fixed value within a range having no influence on control response.

As described above, in the first embodiment, the heading control device for ship, which causes a ship provided with an outboard motor to sail at a desired heading, includes: a heading generator which outputs a heading command; and a controller which outputs a rudder angle command on the basis of the heading command, sensor group information from a sensor group provided to the ship, and characteristic information from a ship motion characteristic information storage unit. Thus, modeling error of a control object which can vary depending on the ship speed or the like can be absorbed through gain scheduling of the control calculator according to the ship speed. As a result, it becomes possible to perform designing robust against change in the characteristic of the control object, and disturbance suppression performance and target value response performance which affect the heading control can be properly adjusted. Further, oscillation excited by disturbance factors to the ship such as tidal current or wind is not promoted, and thus stable heading control can be achieved.

Second Embodiment

Figure 7:
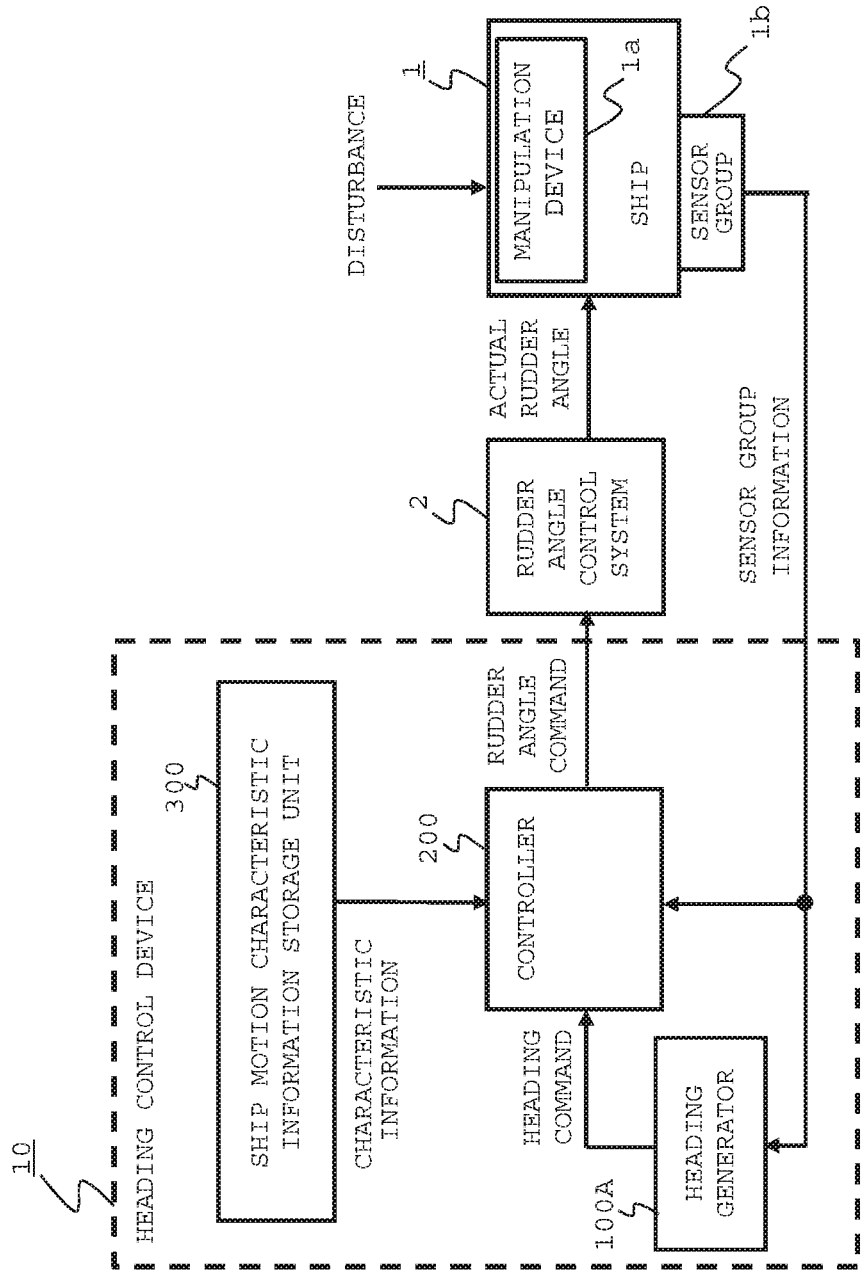
FIG. 7 is a block diagram showing a configuration example of a heading control system for ship according to the second embodiment.

FIG. 7 is a block diagram showing the entire configuration of a heading control system for ship according to the second embodiment, and shows the relationship among a ship as a control object, a sensor group, a rudder angle control system, and a heading control device for ship.

In the above first embodiment, the heading generator 100 for setting the initial condition and the final condition of sailing of the ship 1 is configured such that input is performed to the manipulation device 1*a* of the ship 1, whereas, in the second embodiment, further, the sensor group information SEI outputted from the sensor group 1*b* is inputted to a heading generator 100A. The other components are the same as in FIG. 1, and therefore they are denoted by the same reference characters and description thereof is omitted.

Next, description will be given with reference to FIG. 8 which shows a specific configuration of the heading generator 100A.

Figure 8:
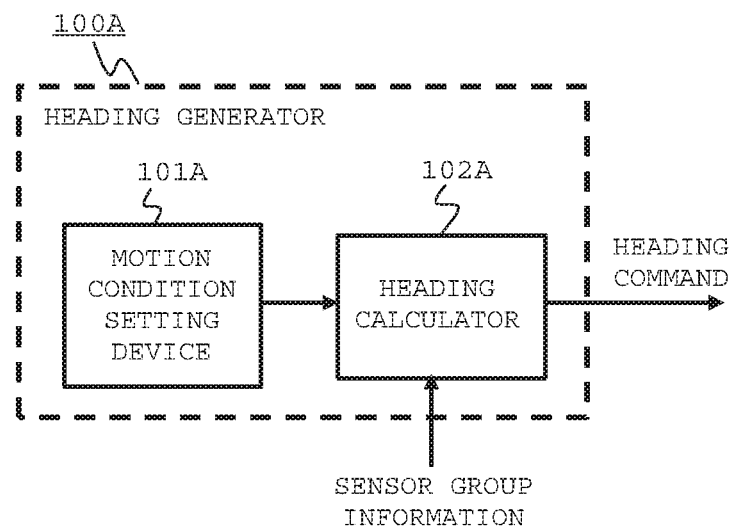
FIG. 8 is a block diagram showing the internal configuration of a heading generator shown in FIG. 7.

In FIG. 8, the heading generator 100A is composed of a motion condition setting device 101A and a heading calculator 102A.

Here, the motion condition setting device 101A is for setting an initial condition and a final condition for sailing of the ship 1. For example, as well as an attitude angle (which is synonymous with heading angle or yaw angle), an angular velocity (obtained by differentiating the attitude angle once with respect to time), and an angular acceleration (obtained by differentiating the attitude angle twice with respect to time), a position, a velocity (obtained by differentiating the position once with respect to time), and an acceleration (obtained by differentiating the position twice with respect to time) can be given, and the initial state before start of sailing and the final state at the time when desired sailing is completed are inputted and set through manipulation of the manipulation device 1a of the ship 1, for example. In inputting and setting in the case of desiring to operate the ship from the initial state to the final state as intended by the ship operator, a position, a velocity, and an acceleration as well as an attitude angle, an angular velocity, and an angular acceleration may be given as numerically represented values.

The heading calculator 102A receives initial state information SCI and final state information ECI outputted from the motion condition setting device 101A, and calculates a profile of heading command information DRC.

Specifically, on the basis of input from the motion condition setting device 101A and the actual yaw rate, the actual heading, the latitude and longitude, and the ship speed in the sensor group information SEI from the sensor group 1b, a heading command relevant to operability and stability is generated so as to satisfy a criterion or a condition such as not exceeding a yaw rate upper limit that does not cause a driver to feel anxious or uncomfortable, for example. As described above, during sailing, under a constraint condition of not exceeding a predetermined yaw rate upper limit, while the actual yaw rate, the actual heading, the latitude and longitude, and the ship speed from the sensor group 1b which are taken in per predetermined control cycle are referred to, an optimization problem formulated by a so-called linear programming problem or quadratic programming problem is sequentially solved, thereby generating a heading command so that the state quantity at present approaches a desirable state quantity.

The sensor group information SEI to be referred to is not limited to the above range, but a value such as an actual roll rate can also be used in combination.

As described above, as well as output information from the motion condition setting device 101A, sensor group information from the sensor group 1b is inputted to the heading calculator 102A, whereby, in addition to the effects shown in the first embodiment, it becomes possible to calculate and generate a heading command while considering operability and stability specific to the driver, and thus heading control according to the driver's intention can be achieved.

Third Embodiment

Figure 9:
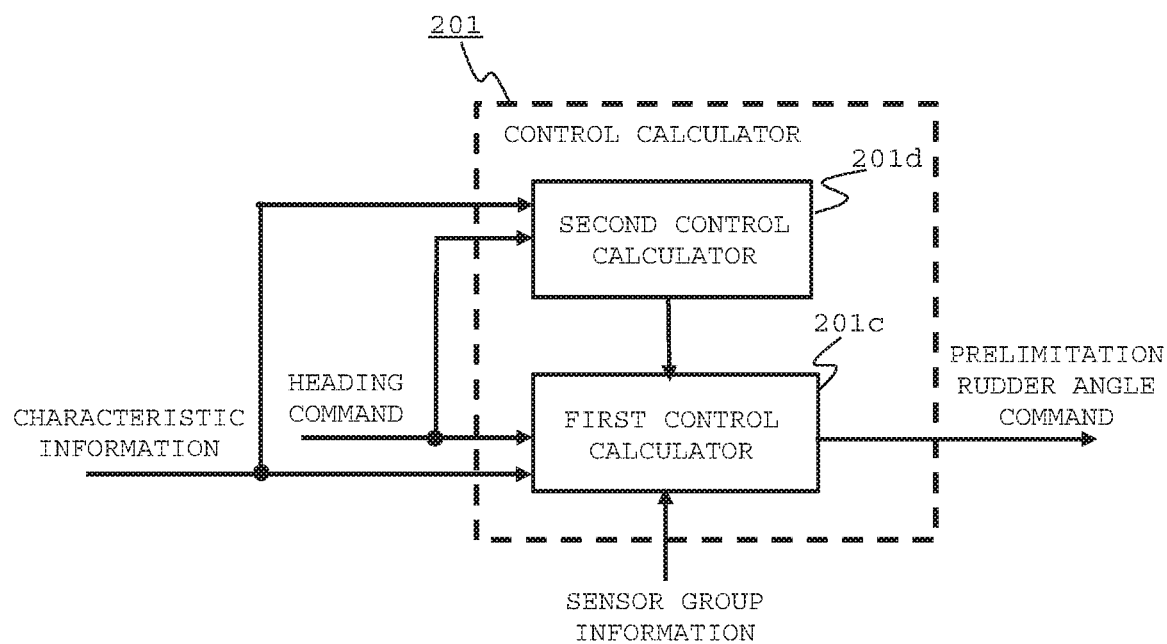
FIG. 9 is a block diagram showing the internal configuration of a control calculator according to the third embodiment.

FIG. 9 is a block diagram showing the internal configuration of a control calculator according to the third embodiment.

In the above second embodiment, output of the first control calculator 201a and output of the second control calculator 201b in the control calculator 201 are added to generate a rudder angle command, whereas, in the third embodiment, output of a second control calculator 201d is inputted to a first control calculator 201c.

The configurations of the ship, the sensor group, and the rudder angle control system are the same as in the first embodiment described above, and therefore description thereof is omitted.

Here, the first control calculator 201c serves a function of feedback control, and in the first embodiment, it has been described that the configuration of the feedback control is optional. That is, in the feedback control system, in order to ensure stability of the control system, a double loop is formed by: an angle control major loop for causing an actual heading which is one piece of the sensor group information SEI to follow a heading command; and an angular velocity control minor loop for causing an actual yaw rate which is one piece of the sensor group information SEI or a value obtained by differentiating the actual heading once with respect to time, to follow an angular velocity command.

In this case, output of the second control calculator 201d can be considered equivalent to an angular velocity command to be inputted to the angular velocity control minor loop of the first control calculator 201c. A specific frequency transfer function of the second control calculator 201d at this time can be expressed as a value obtained by multiplying a predetermined coefficient with a value obtained by differentiating the heading command once with respect to time, considering that the angular velocity minor loop is controlled in a predetermined angular velocity control band. The predetermined coefficient can be set so as to be varied in accordance with, for example, the ship speed, on the basis of characteristic information outputted from the ship motion characteristic information storage unit 300.

According to the third embodiment as described above, the same effects as those shown in the first embodiment can be obtained, and in particular, it is possible to further suppress sudden heading variation of the ship 1 at the time of changing the heading, by inputting the output of the second control calculator 201d to the first control calculator 201c.

In all the above embodiments, as a matter of course, the first control calculator in the controller 200 may be configured by, as well as an angular major loop alone or a double loop of an angular major loop and an angular velocity minor loop, a triple loop of an angle major loop, an angular velocity minor loop, and an angular acceleration minor loop. In this case, the angular acceleration may be calculated by differentiating the actual heading which is one piece of sensor group information twice with respect to time, or may be calculated by differentiating the actual yaw rate once with respect to time.

Further, in all the embodiments, as a matter of course, the controller may be configured using also a framework of the modern control system for implementing state feedback control, as well as a classical control system.

In each embodiment, the heading generator 100, the controller 200, and the ship motion characteristic information storage unit 300 of the heading control device 10, and the control part including the functions configuring these components may be implemented by separate control circuits, or may be integrally implemented as one control circuit.

Although the disclosure is described above in terms of an exemplary embodiment, it should be understood that the various features, aspects and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS 1 ship
1a manipulation device 1b sensor group
10 heading control device
100, 100A heading generator
101, 101A motion condition setting device
102, 102A heading calculator
200 controller
201 control calculator
201a, 201c first control calculator
201b, 201d second control calculator
300 ship motion characteristic information storage unit

What is claimed is:

1. A heading control device for ship, which causes a ship provided with an outboard motor to sail at a desired heading, the heading control device comprising:
    a heading generator which outputs a heading command; and
    a controller which outputs a rudder angle command on the basis of the heading command from the heading generator, sensor group information from a sensor group provided to the ship, and characteristic information from a ship motion characteristic information storage unit,
    wherein the sensor information comprises a ship speed value and the characteristic information comprises an actual yaw rate with respect to the rudder angle for each ship speed value.

2. The heading control device for ship, according to claim 1, wherein the heading generator includes:
    a motion condition setting device for setting a condition that is to be satisfied by a heading, an angular velocity, and an angular acceleration at each point in a sailing route of the ship; and
    a heading calculator for calculating the heading command on the basis of the condition for the heading, the angular velocity, and the angular acceleration outputted from the motion condition setting device.

3. The heading control device for ship, according to claim 1, wherein the controller includes:
    a control calculator which calculates the rudder angle command so that a heading deviation becomes zero, on the basis of the heading command from the heading generator, the sensor group information from the sensor group, and the characteristic information from the ship motion characteristic information storage unit; and
    a band limitation calculator which limits output of the control calculator within a predetermined frequency band and performs a resultant output.

4. The heading control device for ship, according to claim 3, wherein the control calculator gives a control parameter inside the control calculator as a function or a map of a velocity of the ship which is one piece of the sensor group information from the sensor group.

5. The heading control device for ship, according to claim 4, wherein the heading generator includes:
    a motion condition setting device for setting a condition that is to be satisfied by a heading, an angular velocity, and an angular acceleration at each point in a sailing route of the ship; and
    a heading calculator for calculating the heading command on the basis of the condition for the heading, the angular velocity, and the angular acceleration outputted from the motion condition setting device.

6. The heading control device for ship, according to claim 4, wherein the control calculator includes:
    a first control calculator for generating the rudder angle command so that a heading deviation which is a difference between the heading command from the heading generator and an actual heading which is one piece of the sensor group information becomes zero; and
    a second control calculator for generating a command for achieving a desired heading, on the basis of the heading command or output of the first control calculator.

7. The heading control device for ship, according to claim 6, wherein the heading generator includes:
    a motion condition setting device for setting a condition that is to be satisfied by a heading, an angular velocity, and an angular acceleration at each point in a sailing route of the ship; and
    a heading calculator for calculating the heading command on the basis of the condition for the heading, the angular velocity, and the angular acceleration outputted from the motion condition setting device.

8. The heading control device for ship, according to claim 3, wherein the band limitation calculator gives a band limitation parameter inside the band limitation calculator as a fixed value or as a function or a map of a velocity of the ship which is one piece of the sensor group information from the sensor group.

9. The heading control device for ship, according to claim 8, wherein the heading generator includes:
    a motion condition setting device for setting a condition that is to be satisfied by a heading, an angular velocity, and an angular acceleration at each point in a sailing route of the ship; and
    a heading calculator for calculating the heading command on the basis of the condition for the heading, the angular velocity, and the angular acceleration outputted from the motion condition setting device.

10. The heading control device for ship, according to claim 8, wherein the control calculator includes:
    a first control calculator for generating the rudder angle command so that a heading deviation which is a difference between the heading command from the heading generator and an actual heading which is one piece of the sensor group information becomes zero; and
    a second control calculator for generating a command for achieving a desired heading, on the basis of the heading command or output of the first control calculator.

11. The heading control device for ship, according to claim 10, wherein the heading generator includes:
    a motion condition setting device for setting a condition that is to be satisfied by a heading, an angular velocity, and an angular acceleration at each point in a sailing route of the ship; and
    a heading calculator for calculating the heading command on the basis of the condition for the heading, the angular velocity, and the angular acceleration outputted from the motion condition setting device.

12. The heading control device for ship, according to claim 3, wherein the control calculator includes:
    a first control calculator for generating the rudder angle command so that a heading deviation which is a difference between the heading command from the heading generator and an actual heading which is one piece of the sensor group information becomes zero; and
    a second control calculator for generating a command for achieving a desired heading, on the basis of the heading command or output of the first control calculator.

13. The heading control device for ship, according to claim 12, wherein the heading generator includes:

a motion condition setting device for setting a condition that is to be satisfied by a heading, an angular velocity, and an angular acceleration at each point in a sailing route of the ship; and a heading calculator for calculating the heading command on the basis of the condition for the heading, the angular velocity, and the angular acceleration outputted from the motion condition setting device.

14. The heading control device for ship, according to claim 3, wherein the heading generator includes:

a motion condition setting device for setting a condition that is to be satisfied by a heading, an angular velocity, and an angular acceleration at each point in a sailing route of the ship; and a heading calculator for calculating the heading command on the basis of the condition for the heading, the angular velocity, and the angular acceleration outputted from the motion condition setting device.

15. A heading control method for ship, which causes a ship provided with an outboard motor to sail at a desired heading, the heading control method comprising:

outputting a rudder angle command on the basis of a heading command set by a heading generator, sensor group information inputted from a sensor group provided to the ship, and ship motion characteristic information stored in a ship motion characteristic information storage unit, wherein the sensor information comprises a ship speed value and the characteristic information comprises an actual yaw rate with respect to the rudder angle for each ship speed value.

\* \* \* \* \*